United States Patent
Guo et al.

(10) Patent No.: US 10,969,767 B2
(45) Date of Patent: Apr. 6, 2021

(54) NETWORK ADAPTED CONTROL SYSTEM

(71) Applicant: Mitsubishi Electric Research Laboratories, Inc., Cambridge, MA (US)

(72) Inventors: Jianlin Guo, Newton, MA (US); Yehan Ma, St. Louis, MO (US); Yebin Wang, Cambridge, MA (US); Ankush Chakrabarty, Cambridge, MA (US); Heejin Ahn, Cambridge, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 79 days.

(21) Appl. No.: 16/239,574

(22) Filed: Jan. 4, 2019

(65) Prior Publication Data

US 2020/0218239 A1 Jul. 9, 2020

(51) Int. Cl.
| | | |
|---|---|---|
| *H04W 72/04* | (2009.01) | |
| *G05B 19/418* | (2006.01) | |
| *H04L 12/24* | (2006.01) | |
| *H04W 72/10* | (2009.01) | |
| *H04W 72/12* | (2009.01) | |

(52) U.S. Cl.
CPC ...... *G05B 19/4185* (2013.01); *H04L 41/0823* (2013.01); *H04W 72/0446* (2013.01); *H04W 72/10* (2013.01); *H04W 72/1247* (2013.01)

(58) Field of Classification Search
CPC .......... G05B 19/4185; H04W 72/0446; H04W 72/1247; H04W 72/10; H04L 41/0823
See application file for complete search history.

(56) References Cited

U.S. PATENT DOCUMENTS

| | | | |
|---|---|---|---|
| 2007/0268835 A1* | 11/2007 | Kashiwagi | G05B 19/0425 370/242 |
| 2009/0105850 A1* | 4/2009 | Miyata | H04L 12/40169 700/28 |
| 2011/0189957 A1* | 8/2011 | Hocke | G08C 17/02 455/41.3 |
| 2013/0079899 A1* | 3/2013 | Baramov | G05B 21/02 700/32 |
| 2017/0060102 A1* | 3/2017 | Sargolzaei | G05B 13/047 |
| 2018/0302330 A1* | 10/2018 | Bush | H04L 47/27 |
| 2019/0306733 A1* | 10/2019 | Yano | H04W 24/08 |
| 2019/0322299 A1* | 10/2019 | Mong | B61L 15/0036 |

* cited by examiner

*Primary Examiner* — Hassan Kizou
*Assistant Examiner* — Mahbubul Bar Chowdhury
(74) *Attorney, Agent, or Firm* — Gennadiy Vinokur; Hironori Tsukamoto (57) ABSTRACT

A networked control system for controlling at least one plant includes a receiver configured to receive a feedback signal indicative of a current state of a controlled variable of a plant over a wireless link and a controller configured to determine a control command based on a control error between a reference state of the controlled variable and the current state of the control variable. The system also includes a processor configured to determine, based on a function of the control error, a number of transmission times a packet with the control command needs to be transmitted over the wireless link, and a transmitter configured to transmit the packet over the wireless link the number of transmission times.

14 Claims, 10 Drawing Sheets

NETWORK ADAPTED CONTROL SYSTEM

TECHNICAL FIELD

This invention relates generally to control system, and more particularly to a networked control system adapted for controlling a plant with control commands transmitted over wireless network.

BACKGROUND

A Networked Control System (NCS) is a control system wherein the control loops are closed through a wireless communication network. The defining feature of an NCS is that control and feedback signals are exchanged among the system's components in the form of information packets through a wireless network.

The NCS has an ability to connect cyberspace to physical space enabling the execution of several tasks from long distance. In addition, networked control systems eliminate unnecessary wiring reducing the complexity and the overall cost in designing and implementing the control systems. They can also be modified or upgraded by adding sensors, actuators and controllers with relatively low cost and no major changes in their structure. Moreover, featuring efficient sharing of data between their controllers, NCSs are able to fuse global information to make intelligent decisions over large physical spaces.

Their potential applications are numerous and cover a wide range of industries such as space and terrestrial exploration, access in hazardous environments, factory automation, remote diagnostics and troubleshooting, experimental facilities, domestic robots, aircraft, automobiles, manufacturing plant monitoring, nursing homes and tele-operations. While the potential applications of NCS are numerous, the proven applications are few, and the real opportunity in the area of NCS is in developing real-world applications that realize the area's potential.

Advent and development of the Internet combined with the advantages provided by NCS attracted the interest of researchers around the globe. Along with the advantages, several challenges also emerged giving rise to many important research topics. The insertion of the communication network in the feedback control loop makes the analysis and design of an NCS complex, since it imposes additional time delays in control loops or possibility of packet loss.

To that end, practical NCS applications use remote controllers cautiously. For example, a system described by Y. Tipsuwan and M.-Y. Chow, "Control methodologies in networked control systems," provides a remote controller only as a reference provider. Such a remote controller runs much slower than necessary for a stable control loops to provide reference inputs for optimal process operation. In addition, such a remote controller has insufficient authority to shape the transient of the closed-loop control system, and thus might cause performance loss.

Accordingly, there is still a need for a control system adapted to perform as NCS.

SUMMARY

It is an object of some embodiments to provide a control system suitable to transmit control command over a wireless network to enable networked control system (NCS). It is an object of one embodiment to provide such a control system that ensures a stable control of the plant even when some of control commands transmitted over the wireless network are lost.

Some embodiments are based on recognition that networked control system (NCS) is a merger of two different technologies: wireless communication and control system technology. Wireless communication, or sometimes simply wireless, is the transfer of information between two or more points that are not connected by an electrical conductor. A number of popular wireless technologies use radio waves. A control system manages, commands, directs, or regulates the behavior of other plants, devices or systems using control loops. A control system can use a feedback signal to automatically control a process or operation. For example, a control system compares the value or status of the process variable (PV) being controlled with the desired value or setpoint (SP), and applies the difference as a control signal to bring the process variable output of the plant to the same value as the setpoint.

The wireless communication and control system are independent technologies, i.e., one technology can and usually is used without another one. To that end, a number of techniques are developed to ensure performance of each technology, e.g., to ensure packet delivery for wireless communication or efficient feedback control for control systems. However, all of those techniques are independent from each other, which should not come as a surprise considering independence and history of these technologies.

Some embodiments are based on realization that because the NCS merges these two technologies, the independent techniques ensuring performance of each technology can also be merged together to increase a common performance. For example, a performance of wireless transmission is a function of a number of packets dropped, i.e., failed to be delivered, during the transmission. In contrast, a performance of a controller is a function of a deviation of a controlled variable of the controlled plant from its reference value. Some embodiments are based on realization that these performance metrics can be merged by determining performance of wireless transmission as a function a deviation of a controlled variable of the controlled plant from its reference value. Such a merger allows developing techniques for improving performance of the wireless transmission in order to improve performance of the control system.

For example, one technique to remedy the poor performance of wireless transmission is to increase the number of transmitted packets. The more packets dropped, the more packets need to be transmitted to ensure delivery. The number of dropped packets can be estimated using various network techniques, e.g., can be estimated from acknowledgment receipts sent by a receiver. Some embodiments are based on realization that, additionally or alternatively to network techniques, the number of transmitted packets can be estimated using control techniques, i.e., based on performance of the controller: the poorer the performance is, the more packets need to be transmitted. This is because one reason for poor performance of the controller can be poor performance of the wireless transmission. In addition, to ensure stability of controlled system, the reliable packet delivery is more critical for underperforming controller than for the controllers that manage to track the reference signal accurately.

To that end, some embodiments discloses a NCS that includes a receiver configured to receive a feedback signal indicative of a current state of a controlled variable; a controller is configured to determine a control command based on a control error determined as a function of a difference between a reference state of the controlled variable and the current state of the control variable; a controller state observer is configured to wrap the control command in a form of a packet suitable for wireless transmission and to determine a number of times the wireless transmission of the packet needs to be performed, wherein the state observer determines the number of times the wireless transmission of the packet based on a function of the control error; and a transmitter configured to transmit the packet over a wireless link the number of times determined by the state observer.

Advantageously, determination of a rate of transmission of the packets based on controller performance can reduce the network congestion. In a number of situations, quality of the wireless links is the main cause for reduction of the performance of the controller. However, the packet transmission is not increased automatically when the packets are dropped due to the poor quality of the wireless links. The number of times the packet is transmitted is increased only if such a drop negatively affects the control performance.

Additionally, or alternatively, some embodiments are based on recognition that performance of controller is an indication of a quality of a wireless link between the controller and the controlled plant. Hence, determination of the rate of transmission based on performance of controller can reduce or even can eliminate the need for acknowledgment receipt of network protocol to reduce the network congestion further. In these embodiments, due to the merging of wireless communication and system control technologies, the feedback signal of the control is an indication of the feedback signal of the network transmission.

For example, in some embodiments, the state observer determines quality of the wireless link between the controller and the plant based on the control error, and determines the number of times of the wireless transmission of the packet based on the quality of the wireless link. In effect, this embodiment can use various techniques developed for increasing performance of wireless communication without the need for estimating that performance.

Additionally, or alternatively, in some embodiments, the NCS includes a scheduler configured to determine the number of times of wireless transmission of the packets for different controlled plants by solving an optimization problem that aims to minimize a total control error of the set of controlled plans. These embodiments are based on recognition of advantages of a total control of different plants rather than each individual control.

For example, in one implementation, the scheduler selects times of transmission of packets for different controlled plants in an order corresponding to an order of the control errors of the controlled plants, such that an earlier time of transmission is assigned to the packet for the controlled plants with bigger control error. This implementation is heuristic, relatively simple to implement to achieve the desired result.

Additionally, or alternatively, some embodiments extend the usage of performance of the controller for scheduling the packet transmission. These embodiments are based on recognition that the time of transmission of the packets are also important to improve latency of control. For example, in some embodiments, NCS controls a set of plants based on a set of corresponding control errors. Hence, the NCS includes a scheduler configured to determine priorities of the controlled plants based on their corresponding control errors and determine a schedule of transmission of the packets for different controlled plants according the determined priorities, such that the transmitter transmits each packet according to the schedule.

For example, in one implementation, the scheduler schedules transmission times based on the sorting and spreading so that the priority is determined by control error, the control loops with the bigger control error are scheduled to transmit earlier and the control loops with the smaller control error are scheduled to transmit later. Furthermore, to increase transmission reliability, if multiple transmissions are scheduled for a control loop in a scheduling period, these transmissions spread so that transmissions do not take place in consecutive time slots.

In various implementations, the scheduler is flexible in assigning different number of times for different packet transmission. For example, there can be a situation when there are more packets to be transmitted than a number of time slots in the next scheduling period. In this situation, the scheduler can reduce a number of packets transmitted to different plants. In one embodiment, the scheduler attempts to schedule at least one packet for each controlled plant. In another embodiment, however, the scheduler does not have this objective. For example, in some situations, e.g., for at least one next scheduling period, the scheduler determines multiple packet transmissions for a first controlled plant and at least one packet transmission for a second controlled plant. However, the scheduler can determine a schedule for the next scheduling period to include multiple packet transmission for the first controlled plant and zero packet transmission for the second controlled plant.

Additionally, or alternatively, in some embodiments where there is a need to control a set of plants, there are a set of NCSs that form a networked control architecture. This is advantageous because different plants can be located at distance from each other, and it is more convenient to develop each NCS as a standalone device to place it in proximity to corresponding plant. In those embodiments, the scheduler can be implemented as a separated device in communication with the set of NCSs or as part of one or multiple NCSs. In all situations, the scheduler determines a time of transmission for packets of each NCS and commands the transmitter of each NCS to transmit according to the schedule.

Accordingly, one embodiment discloses a networked control system (NCS) for controlling at least one plant, including a receiver configured to receive a feedback signal indicative of a current state of a controlled variable of a plant over a wireless link; a controller configured to determine a control command based on a control error between a reference state of the controlled variable and the current state of the control variable; a processor configured to determine, based on a function of the control error, a number of transmission times a packet with the control command needs to be transmitted over the wireless link; and a transmitter configured to transmit the packet over the wireless link the number of transmission times.

Another embodiment discloses a method for controlling at least one plant over a wireless link, wherein the method uses a processor coupled with stored instructions implementing the method, wherein the instructions, when executed by the processor carry out at least some steps of the method. The method includes receiving a feedback signal indicative of a current state of a controlled variable of a plant over a wireless link; determining a control command based on a control error between a reference state of the controlled variable and the current state of the control variable; determining, based on a function of the control error, a number of transmission times a packet with the control command needs to be transmitted over the wireless link; and transmitting the packet over the wireless link the number of transmission times.

Yet another embodiment discloses a non-transitory computer readable storage medium embodied thereon a program executable by a processor for performing a method, the method includes receiving a feedback signal indicative of a current state of a controlled variable of a plant over a wireless link; determining a control command based on a control error between a reference state of the controlled variable and the current state of the control variable; determining, based on a function of the control error, a number of transmission times a packet with the control command needs to be transmitted over the wireless link; and transmitting the packet over the wireless link the number of transmission times.

DETAILED DESCRIPTION

Figure 1A:
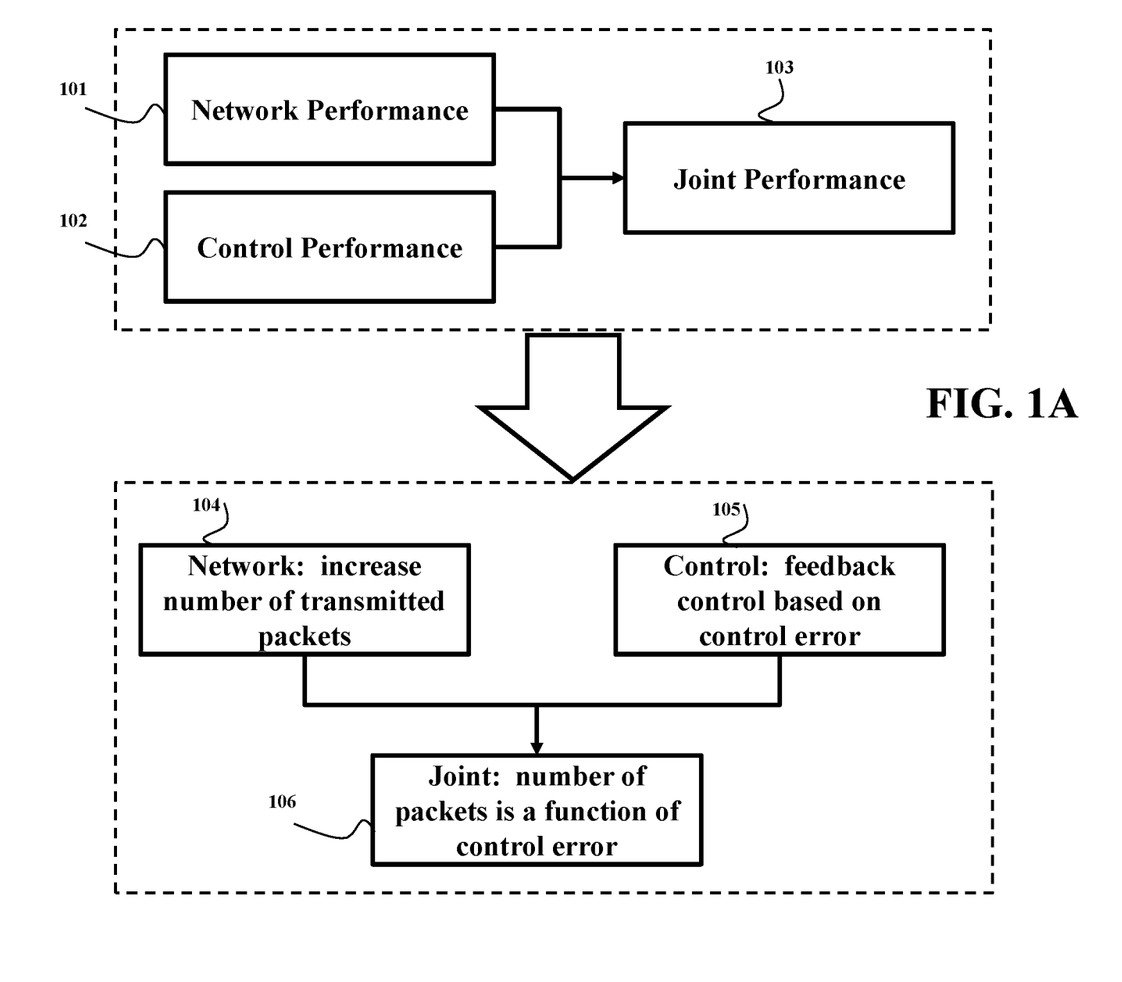
FIG. 1A shows a schematic of some principles used by exemplar embodiments.

FIG. 1A shows a schematic of some principles used by exemplar embodiments. Some embodiments are based on recognition that networked control system (NCS) is a merger of two different technologies: wireless communication and control system technology. The wireless communication and control system are independent technologies, i.e., one technology can and usually is used without another one. To that end, different techniques are developed to ensure performance of each technology, e.g., to ensure packet delivery for wireless communication or efficient feedback control for control systems. However, all of those techniques are independent from each other, which should not come as a surprise considering independence and history of these technologies.

Some embodiments are based on realization that because the NCS merges these two technologies, the independent techniques ensuring network performance 101 and control performance 102 can also be merged together to increase a joint performance 103. For example, a performance 101 of wireless transmission is a function of a quality of wireless links, e.g., a number of packets dropped, i.e., failed to be delivered, during the transmission. In contrast, a performance of a controller is a function of a deviation of a controlled variable of the controlled plant from its reference value. Some embodiments are based on realization that these performance metrics can be merged by determining performance of wireless transmission as a function a deviation of a controlled variable of the controlled plant from its reference value. Such a merger allows developing techniques for improving performance of the wireless transmission in order to improve performance of the control system.

For example, one technique to remedy the poor performance of wireless transmission is to increase the number of transmitted packets 104. The more packets dropped, the more packets need to be transmitted to ensure delivery. The number of dropped packets can be estimated using various network techniques, e.g., can be estimated from acknowledgment receipts sent by a receiver. Some embodiments are based on realization that, additionally or alternatively to network techniques, the number of transmitted packets can be estimated using control techniques 105, i.e., based on performance of the controller indicated by an error of the control. For example, the grater the control error is, the more number of packets are transmitted. This is because one reason for poor performance of the controller can be poor performance of the wireless transmission. In addition, to ensure stability of controlled system, the reliable packet delivery is more critical for underperforming controller than for the controllers that manage to track the reference signal accurately. To that end, NCS of some embodiments transmit a control commands to a remote plant a number of times determined based on a function of the control error of the plant. For example, a control error can be represented as a difference between current state of the plant and a desired state of the plant and/or as a difference between a current value of a control variable and a reference value of the control variable. In effect, transmitting a control command a number of times determined based on a control error increases performance of the controller with only necessary increase of network overhead.

Figure 1B:
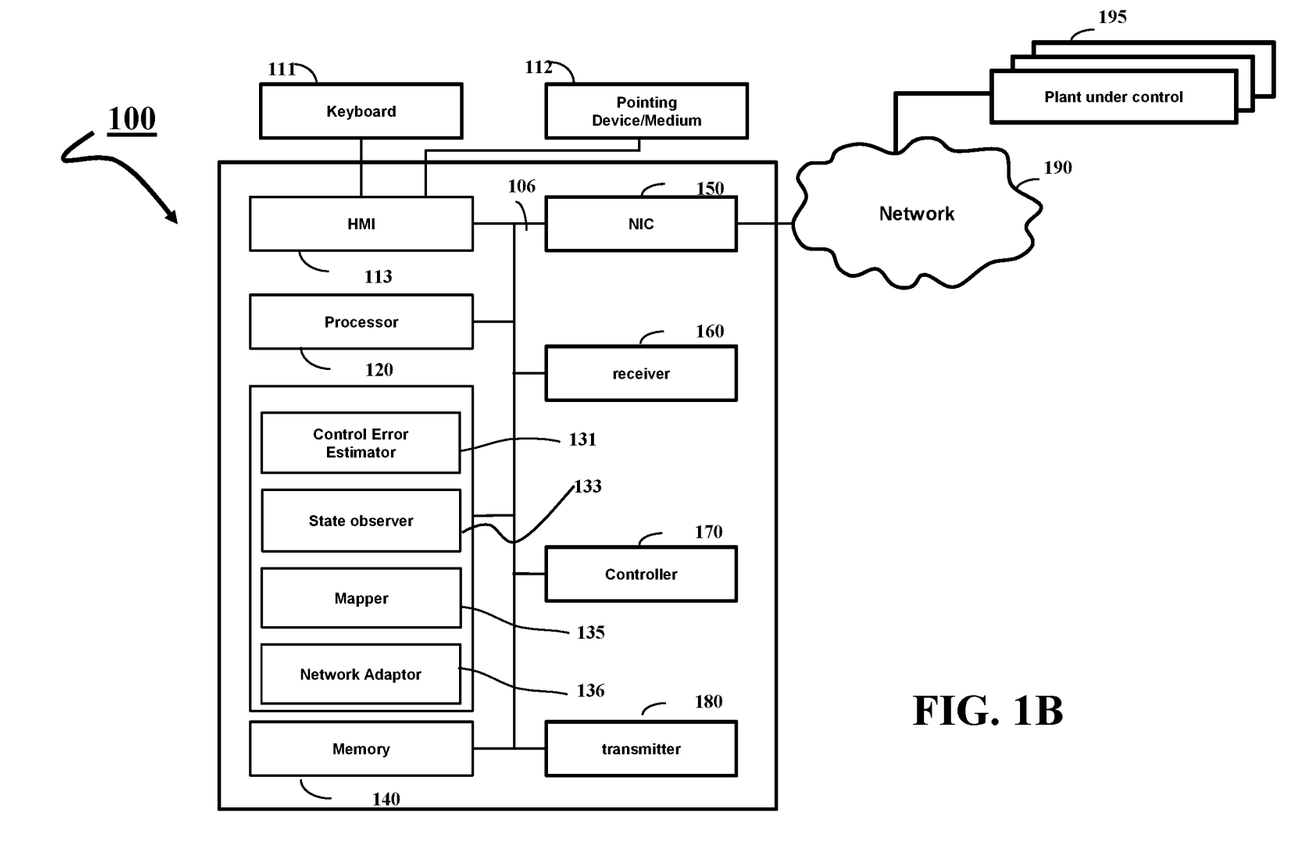
FIG. 1B shows a block diagram of a control system for controlling a plant performing an operation according to some embodiments.

FIG. 1B shows a block diagram of a control system 100 for controlling a plant performing an operation according to some embodiments. The components of the system 100 can vary for different configurations of the system 100. The components can be implemented as software components executed by a processor, hardware components, or combination thereof. The control system 100 can have a number of interfaces connecting the system 100 with other systems and devices. A network interface controller 150 is adapted to connect the system 100 through the bus 106 to a network 190 connecting the control system 100 with one or multiple controlled plants 195. In some implementations, a human machine interface 113 within the system 100 connects the system to a keyboard 111 and/or pointing device 112, wherein the pointing device 112 can include a mouse, trackball, touchpad, joy stick, pointing stick, stylus, or touchscreen, among others.

The system 100 includes a controller 170 configured to determine a control command for controlling a plant 195 based on a control error between a reference state of the controlled variable and the current state of the control variable. Through the interface 113 or NIC 150, the system 100 can receive configuration values for the controller 170. Examples of the configuration values include a control policy for the plant 195, control objectives for controlling the plant, reference trajectory for controlling the plant.

The system 100 can include a receiver 160 configured to receive a feedback signal indicative of a current state of a controlled variable of a plant over a wired or wireless link, e.g., through the network 190. The system 100 can include a transmitter 180 configured to transmit the control command to the plant. Typically, the transmitter transmits a packet that includes the control command. The packet is organized according to various wireless network transmission standards. The transmitter can transmit a packet multiple times if necessary.

The system 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through the bus 106 to one or more input and output devices. These instructions implement at least some components and/or steps of networked control system (NCS) method for controlling a plant.

To that end, the control system 100 includes one or several following modules implemented using the processor. The modules include a control error estimator 131 to determine a control error between a reference state of the controlled variable and the current state of the control variable. In some embodiments, the control error is not only used for determining a control command for changing the state of the plant, but also to determine parameters of network transmission of the control command. The control error estimator can be implemented as a part of the controller 170, can be used as a standalone block estimating the control error independently from the controller 170, and/or can include an input interface to receive the control error from the controller 170.

The modules include a state observer 133 configured to determine number of transmission times a packet with the control command needs to be transmitted over the wireless link. The state observer 133 determined the number of transmissions based on a function of the control error. In effect, this allows to merge network and control performance techniques to improve the overall performance of NCS.

In some embodiments, the state observer determines the number of transmission times based on a mapper 135. The mapper 135 can include various forms of relationship between the number of transmission times and the control error. For example, the number of transmission of the packet can be proportional to the control error. Additionally, or alternatively, the values of different control errors can be mapped via a regression function to the number of transmissions of the packet including the control command determined to correct that error.

Figure 1C:
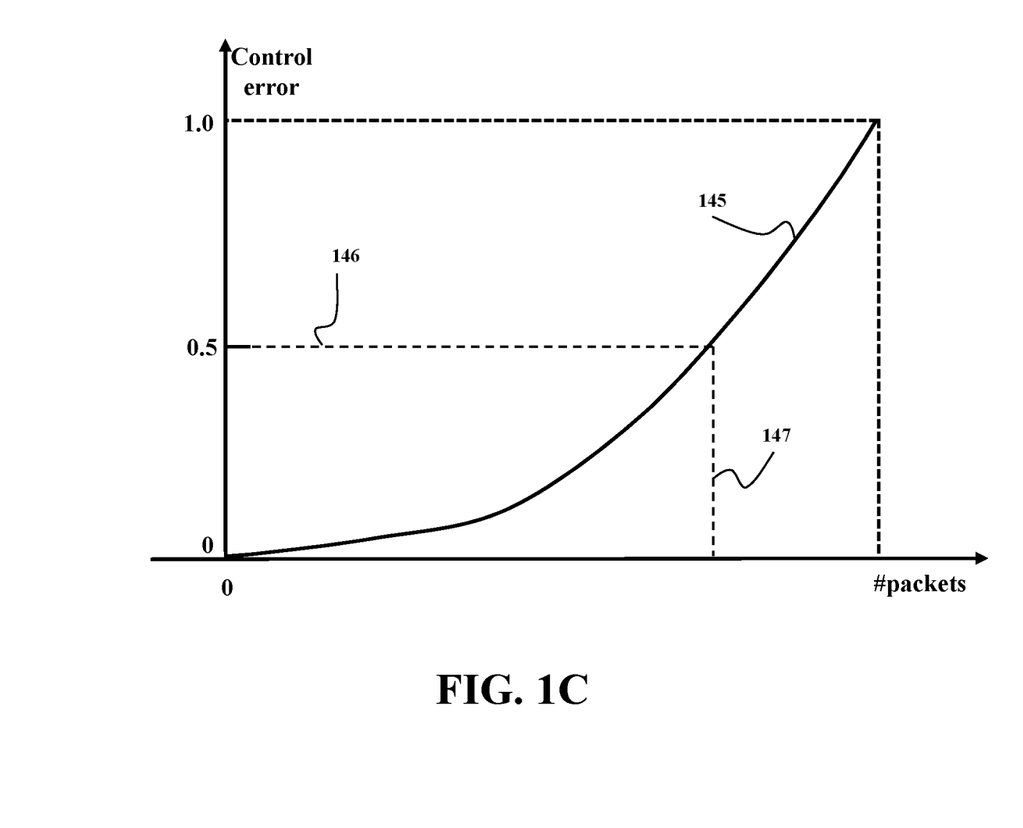
FIG. 1C shows a plot that maps values of the control errors to values of a number of transmissions of the packet including a control command determined to correct that control error according to some embodiments.

FIG. 1C shows a plot that maps 145 values of the control errors to values of a number of transmissions of the packet including a control command determined to correct that control error according to some embodiments. For example, if the control error estimator 131 determines the control error 146, the state observer 133, using the mapper 135 having the mapping 145, determines the number of transmissions 147.

A network adapter 136 wraps the control command in a form of a packet suitable for wireless transmission, and the transmitter 180 transmits the packet over the wireless link the number of transmission times. For example, In some embodiment, the network 190 is wireless network implemented using different standards such as WiFi, ISA100, WirelessHART, and ZigBee. In those embodiments, the network adapter 136 wraps the control command in a form of a packet according to the corresponding standard.

The controller 170 can be implemented using various control techniques. For example, in one embodiment, the controller 170 is a proportional-integral-derivative controller (PID controller) to implement a control loop feedback control. A PID controller continuously calculates a control error e(t) as the difference between a desired setpoint (SP) and a measured process variable (PV) and applies a correction based on proportional, integral, and derivative terms.

Additionally, or alternatively, in one embodiment, the controller 170 uses optimization based control and estimation techniques, such as model predictive control (MPC). The MPC is based on a real time finite horizon optimization of a model of a system. The MPC has the ability to anticipate future events, and to take appropriate control actions. This is achieved by optimizing the operation of the system over a future finite time-horizon subject to constraints, and only implementing the control over a current time step.

Figure 1D:
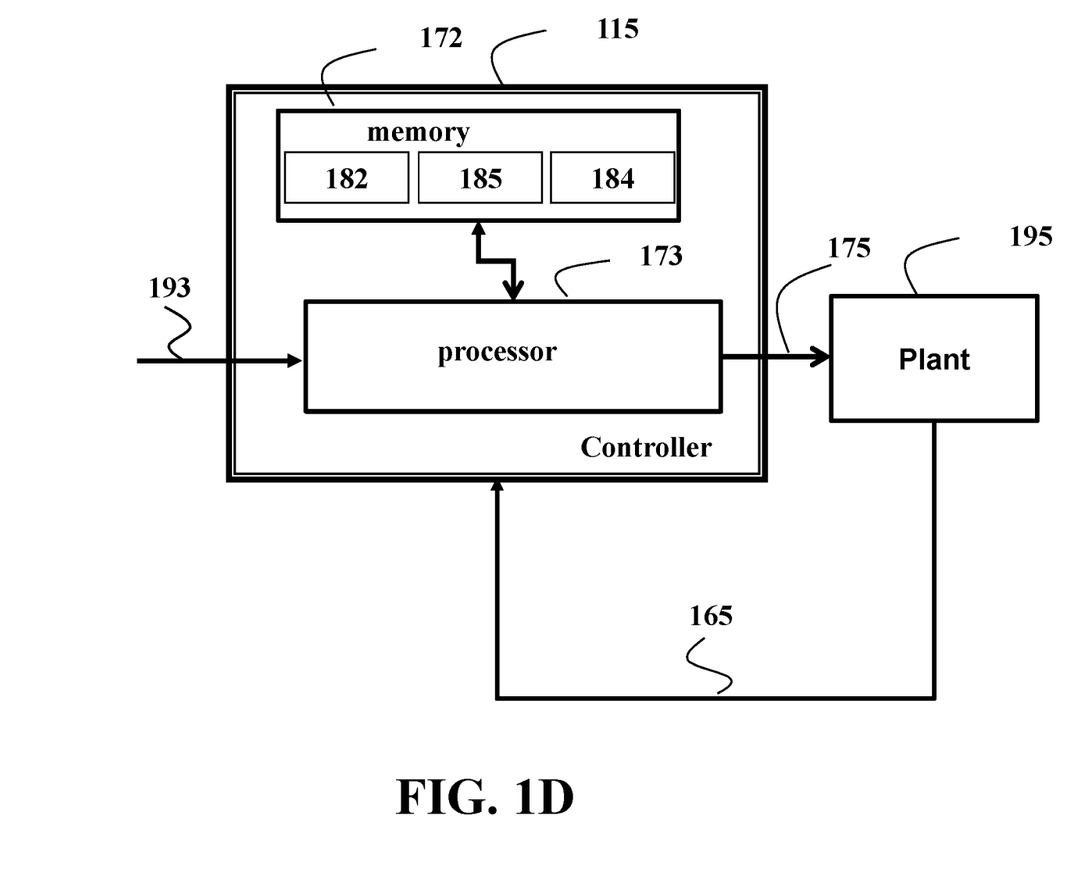
FIG. 1D shows a general structure of a controller according one embodiment.

FIG. 1D shows a general structure of a controller 170 according to one embodiment. In this embodiment, the controller 170 is implemented as a standalone device. Additionally, or alternatively, the controller 170 can be implemented using a processor 120. The controller 170 includes at least one processor 173 for executing modules of the controller. The processor 173 is operatively connected to a memory 172 for storing a model 182 of the plant 118, the cost function 185 defining the control policy and, optionally the constraints 184 on the operation of the plant. The controller 170 determines the control commands 175 using the control policy optimizing, using the model 182 and the state of the plant 165, the cost function 185 subject to constraints 184. For example, the control commands 175 can be determined to command the plant 118 to track a reference trajectory 193. The controller transmits the control commands 175 via a transmitter 180 to the plant 195, and receives, using the receiver 160, the feedback signal 165 measured by the sensors of the plant 195 and indicative of its state.

Figure 2A:
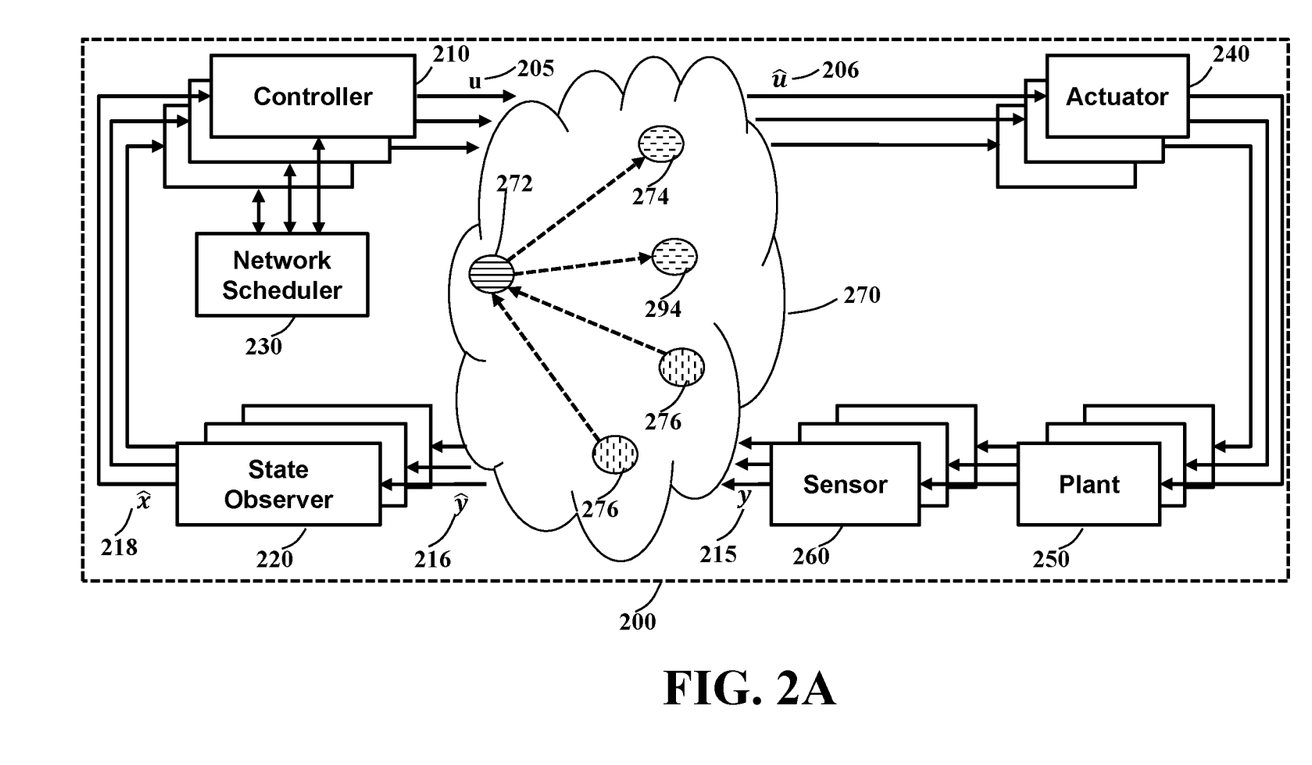
FIG. 2A is a schematic diagram illustrating principles of operations of the wireless networked control system (NCS) according one embodiment.

FIG. 2A is a schematic diagram illustrating principles of operations of the wireless networked control system (NCS) 200 according to one embodiment. In this embodiment, the operations of the NCS 200 are enabled by one or multiple controllers 210, one or multiple state observers 220 of the controllers, a network scheduler 230, actuators 240, one or multiple physical plants 250, one or multiple sensors of plants 260 and a wireless communication network 270.

In this embodiment, the state observer is a functional block of the controller and can be integrated into the controller. The state observer is separately illustrated to emphasize its operations in the control system. At the controller side, based on the received feedback signal $\hat{y}$ 216, state observer 220 of the controller computes or observes current state variable $\hat{x}$ 218. Using current state variable $\hat{x}$ 218 and other information, controller 210 generates new control command u 205. At the scheduled transmission time, controller 210 transmits control command u to actuator 240 of physical plant 250 over wireless communication network 270. At the physical plant side, depending on the link quality of wireless communication network 270, the received control command $\hat{u}$ 206 may be different from original control command u. Using the received command $\hat{u}$, actuator 240 directs the operation of physical plant 250. During operation of physical plant 250, the sensor 260 measures status of the plant 250. The sensor transmits measured status data y 215 to the controller 210 over wireless communication network 270. The measured data y 215 can also be called feedback signal in the control system. Notice that the transmitted feedback signal y 215 may also be different from the received feedback signal ŷ 216.

In some implementations, the wireless communication network 270 includes a wireless network coordinator 272, actuator nodes 274 and sensor nodes 276. The network coordinator 272 transmits control commend u 205 to actuator nodes 274. The sensor nodes 276 transmit feedback signal y 215 to network coordinator 272. The dashed arrow is to indicate data traffic flow direction, not the direction of wireless link that can be bi-directional.

All variables x̂, u, û y and ŷ) can be vectors with different dimensions and different types of the elements. The process variable (PV), controlled variable and state variable are considered as same and can be represented by state variable x̂. The setpoint, the desired value and reference value are considered as same and can be represented by reference value.

The wireless link quality change is a typically random process. As a result, the performance metric of wireless communication network is also a random process. There are different metrics to measure the performance of the wireless communication network, e.g., packet receiving rate (PRR), packet drop rate, network throughput, etc. There are different techniques to improve the different performance metrics of the wireless communication network. However, simply improving a specific performance metric of the wireless communication network does not necessarily improve the performance of the corresponding networked control system (NCS).

Figure 2B:
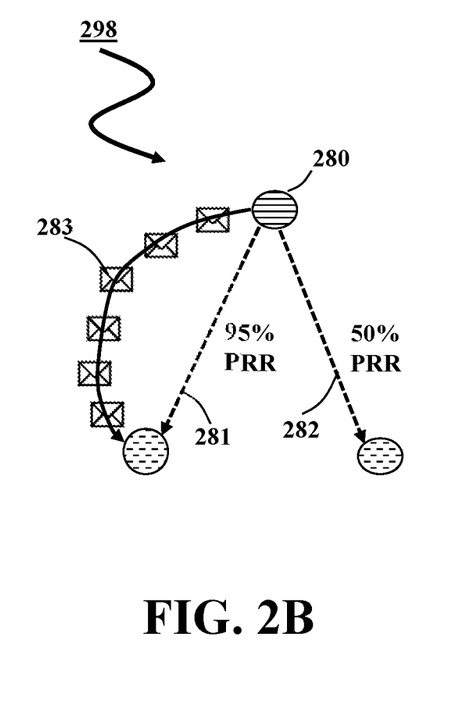
FIGS. 2B and 2C show schematics illustrating principles used by some embodiments.

FIGS. 2B and 2C show schematics illustrating principles used by some embodiments. FIG. 2B sows an example, in which improving network performance metric PRR does not improve control performance. In a two link star wireless network 298, one link 281 has 95% of the PRR and other link 282 has 50% of the PRR. The wireless network coordinator 280 can send packets via two links. To achieve the highest network PRR, the network coordinator 280 would send packets 283 only using the first link 281, which gives a 95% of the network PRR. However, this approach may not work for wireless networked control system (NCS).

Figure 2C:
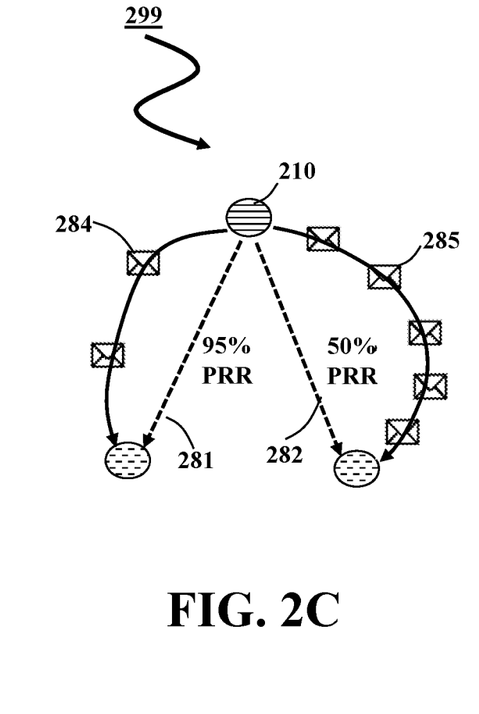

FIG. 2C sows an example of a control system 299 with two control loops, i.e., controlling two physical plants. One plant is controlled via the first link 281 and other plant is controlled via the second link 282. The first control loop performs better than the second control loop. In this case, the controller 210 needs to improve the performance of the second control loop. Therefore, the more packets need to be sent for the second control loop. As a result, the controller 210 sends less packets 284 via the link 281 and send more packets 285 using the link 282. Because in the control system, the higher network PRR does not necessarily produce the better performance of the overall control system.

In control system, a control loop is a process management system designed to maintain process variables (PVs) at the desired setpoints (SPs). The deviation between the value of the process variable and the desired setpoint can be consider as control error. In the wireless NCS, the control error and wireless link quality are inversely related: control error decreases as link quality increases and control error increases as link quality decreases. In other words, bigger control error indicates poorer link quality and smaller control error indicates better link quality.

Figure 3:
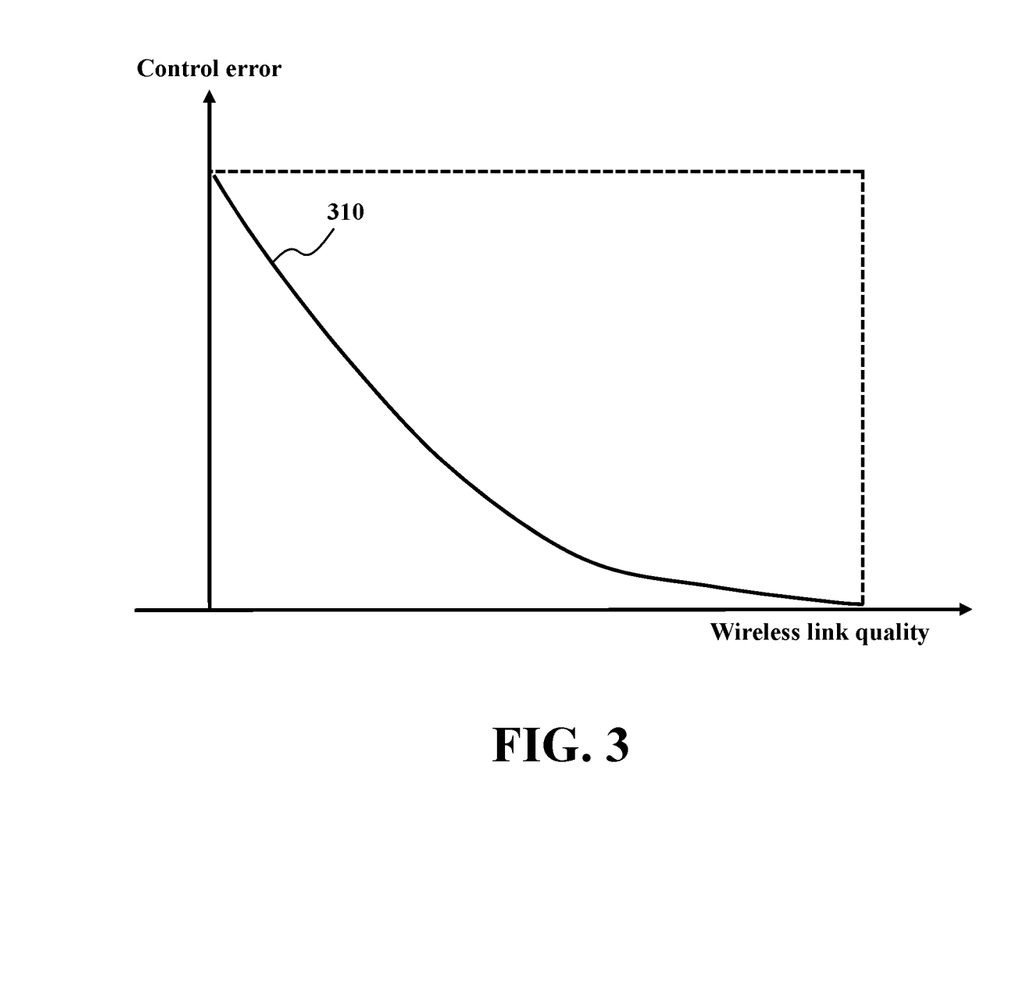
FIG. 3 shows a relationship curve between values of control error and link quality determined by some embodiments.

FIG. 3 shows a relationship curve 310 between values of control error and quality of a link connecting the controller with the plant as determined by some embodiments. For example, the curve 310 can be determined offline or online based on measurements of the control error and link quality. There are different ways to determine link quality in a wireless communication network, e.g., measuring link quality duration the transmission or predicting the link quality. For a specific controlled plant, the corresponding relationship curve can be obtained via the experiment or simulation.

The relationship curve 310 can be used by mapper 133 to assist the state observer in determining a number of packet transmissions. For example, in some embodiments, the state observer determines quality of the wireless link between the controller and the plant based on the control error, and determines the number of times of the wireless transmission of the packet based on the quality of the wireless link. In effect, this embodiment can use various techniques developed for increasing performance of wireless communication without the need for estimating that performance.

Single Control Loop Case

In a wireless NCS, multiple control loops can be formed between a controller and a physical plant. In the embodiments of the invention, a control loop is used to refer the control process between a controller and a physical plant. It is understood that this is not a restriction or assumption, it is just for description convenience.

In a wireless NCS, time is typically divided into periodic control period called scheduling period or scheduling interval, which is in turn divided into time slots. In each control period, controllers and sensors make transmissions in the dedicated transmission time slot to avoid the packet collision. Therefore, time slot assignment becomes critical. Depending on the number of control loops, i.e., number of physical plants, time slot assignment approach is different.

In a wireless NCS with only one control loop, there is no wireless communication network sharing among control loops. Therefore, the state observer of the controller can determine the number of times a control command or sensor data to be transmitted in a control period based on control error and link quality relationship curve. For example, if current control error indicates a 0.5 of packet receiving rate (PRR), the control command and sensor data will be transmitted twice to stochastically ensure the control command and sensor data are received by the actuator and controller, respectively. Once the number of transmission times is determined, the state observer of the controller can assign time slot for each transmission. Specifically, the transmitter of the wireless communication network coordinator is configured to transmit the control command twice at the assigned transmission time slots. After receiving the control command, the actuator then direct the plant. The sensors measure plant status and transmit feedback signal twice at the assigned time slots.

Multiple Control Loop Case

However, if there are more than one control loops in a wireless NCS, the wireless communication network 270 is shared by multiple control loops. The controller state observer of one control loop may not know the control errors of other control loops. In other words, the controller state observer of one control loop may not know the number of transmission times needed by other control loops. In a control period or scheduling period, total number of slots fixed. It is possible that the sum number of transmission times for all control loops may exceed the allocated time slots in a control period. Simultaneous transmissions may cause packet collision.

Therefore, some embodiments use a network scheduler 230 to schedule allocated time slots among the multiple control loops to achieve optimal overall control system performance. In this case, the time slot scheduling decision is more complicated than single control loop case. Some embodiments provide a scheduling method, in which time slots are scheduled to improve the overall control system performance and to reduce overall control error.

Figure 4:
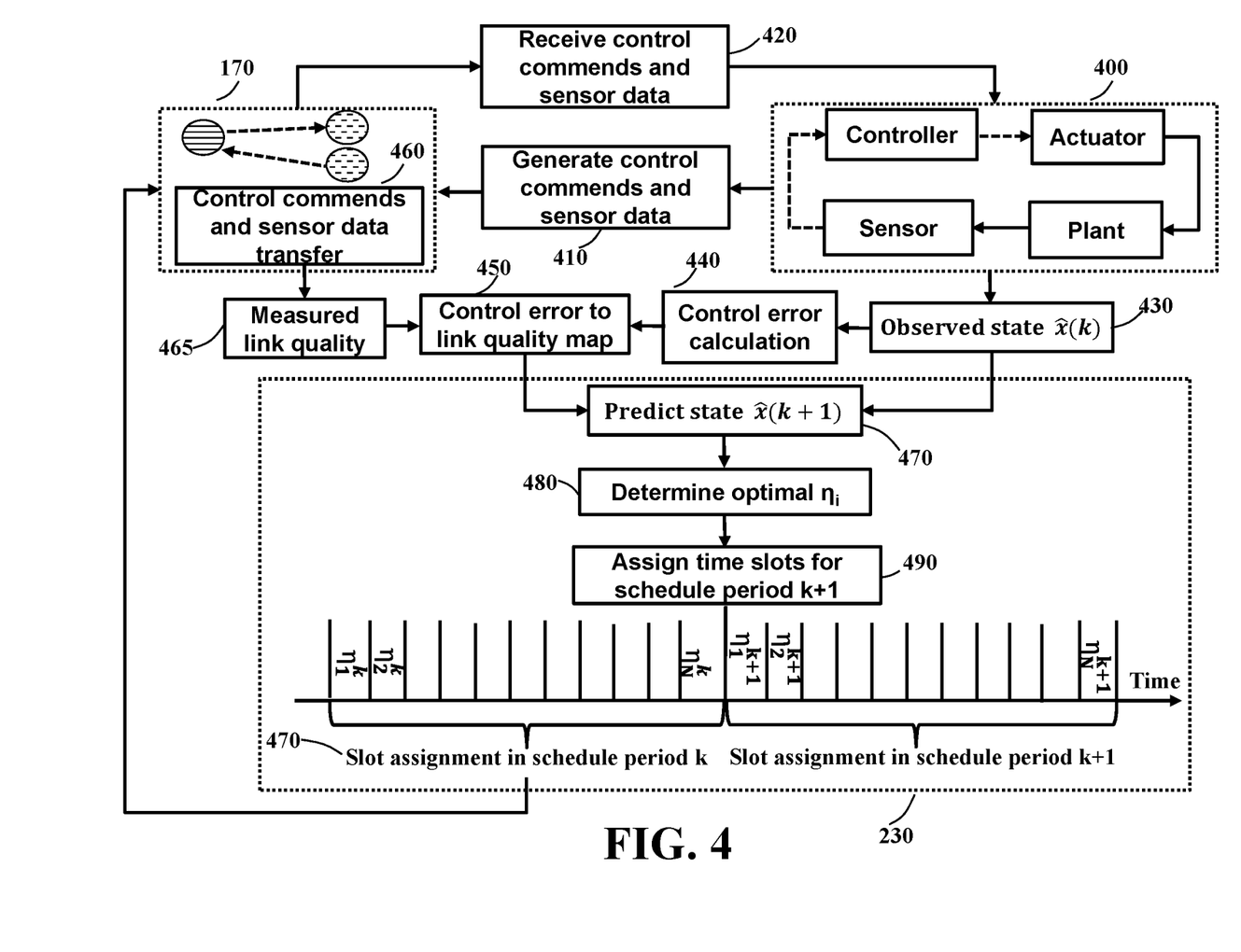
FIG. 4 shows a functional block diagram of network control loops at a scheduling period according to an exemplar embodiment.

FIG. 4 shows a functional block diagram of network control loops at the scheduling period k according to an exemplar embodiment. In this example, there are N control loops, i.e., N plants, in the wireless networked control system (NCS), denoted as control loop 1, control loop 2, . . . , control loop N, where numbers 1, 2, . . . , N refer control loop ID. The functions of the wireless NCS are distributed to three components: the control loop 400, wireless communication network 270 and network scheduler 230.

The control loop 400 include controllers, actuators, plants and sensors. Wireless communication network 270 includes the wireless network coordinator node, actuator nodes and sensor nodes. The network scheduler 230 is a functional component of the wireless NCS. The control loop 400 is responsible for generating control commands and sensing data 410, receiving control commands and sensor data 420, observing state vector $\hat{x}(k)$ 430, computing control error 440 and determine control error to link quality map 450 by using the control error 440 and measured link quality 465. The control error to link quality map 450 is a discretized representation of control error to link quality curve 310. Therefore, determining control error to link quality map 450 is an implementation of the determining the relationship curve 310 of control error and link quality.

To build control error to link quality map 450 or relationship curve 310 for a control loop, the controller state observer divides possible control error value into multiple levels, e.g., M. The controller state observer calculates and stores control error for each scheduling period. Meanwhile, the wireless communication network 270 measures link quality and stores the measured link quality for each scheduling period. For each control error level j (j=1, 2, . . . , M), the controller state observer looks up the corresponding link quality history. Based on the corresponding link quality history, the controller state observer can compute a link quality value for control error level j, e.g., the average of corresponding link quality history or the expected value of corresponding link quality history.

The wireless communication network 270 is responsible for transfer of control commands and sensor data 460, in which the transfer takes place according to time assignment 470 scheduled by the network scheduler 230 for the scheduling period k. During control command and sensor data transfer 460 process, wireless communication network 270 is also responsible for the wireless link quality measurement 465.

In the scheduling period k, the network scheduler 230 predicts the state vector $\hat{x}(k+1)$ by using the observed state vector $\hat{x}(k)$ 430 and the link quality map 450. Using predicted the state vector $\hat{x}(k+1)$ and link quality map 450, network scheduler 230 then determines 480 optimal number of transmission times $\eta_i$ for each control loop i (i=1, 2, . . . , N) for next scheduling period k+1, where $\eta_1$, $\eta_2$, . . . , $\eta_N$ indicate the number of time slots to be assigned to control loop 1, control loop 2, . . . , control loop N, respectively. Furthermore, the number of transmission times in a time period also indicates the rate of the transmission. The method to determine the optimal number of transmission times is described in next section. Once number of transmission times determined for each control loop, the network scheduler 230 can assign 490 time slots to the control loops for next schedule period k+1. The network scheduler 230 can assign time slots to control loops according to ascending order of the control loop ID, e.g., if $\eta_1=2$, the first two slots are assigned to control loop 1. An alternative and control performance dependent time slot assignment method is described later.

Optimal Number of Transmission Times $\eta_i$ Determination

Consider a wireless network control system (NCS) consisting of N control loops that share a wireless communication network 270 as shown in FIG. 2A. The physical plant of control loop i (i=1, 2, . . . , N) is modeled as a nonlinear discrete system of the form $$x_i(k+1)=f_i(x_i(k),u_i(k)), \tag{1}$$

where k is the time index, $i \in \{1, 2, . . . , N\}$ is the control loop index, $x_i(k) \in R^{ni}$ is the state vector, and $u_i(k) \in R^{mi}$ is the control command vector.

Let $x_i^r$ be the reference state vector or the desired state vector of control loop i (i=1, 2, . . . , N). At time t=k, the control error $e_i = \|x_i(k) - x_i^r\|$ is the deviation between current state vector and the desired state vector of the control loop i, where $\|a\|$ represents the norm of the vector a. It can be seen that the smaller the control error is, the closer current state vector to the desired state vector is. As $x_i(k)$ approaches to the desired state vector $x_i^r(k)$, $e_i$ approaches to 0. As $x_i(k)$ deviates far away from the desired state vector $x_i^r$, $e_i$ becomes bigger.

In the wireless NCS, $x_i(k)$ asymptotically approaches to $x_i^r$ when packet loss approaches to 0. Therefore, the link quality is closely related to control error as shown in FIG. 3. The controller can estimate the link quality based on the control error as described above.

The link quality can be measured by the metrics such as the packet receiving rate (PRR), the packet drop rate, the received signal strength indicator (RSSI), the signal to noise ratio (SNR) and the expected transmission count (ETX). For example, using PRR as link quality metric, for a control loop i, the link failure rate can be determined based on link quality $PRR_i$ as $$\beta_i = 1 - PRR_i. \tag{2}$$

Using the link quality failure rate $\beta_i$, current state vector $x_i(k)$ and control command vector $u_i(k)$, the expected state vector $\hat{x}_i(k+1)$ for time t=k+1 can be computed as $$\hat{x}_i(k+1) = \hat{x}_i^c(k+1) + (\hat{x}_i^o(k+1) - \hat{x}_i^c(k+1))\beta_i^{\eta_i}, \tag{3}$$

where $\hat{x}_i^c(k+1) = f_i(x_i(k), u_i(k))$ represents closed loop when control command vector $u_i(k)$ is received, $\hat{x}_i^o(k+1) = f_i(x_i(k), u_i(k-1))$ represents open loop when control command vector $u_i(k)$ is lost and $\eta_i$ is number of transmission times for control loop i to be determined by optimization.

For control loop i, to optimize for the control error, a quadratic cost function is defined as $$J_i(x_i(k+1)) = (\hat{x}_i(k+1) - x_i^r)^T W_i(\hat{x}_i(k+1) - x_i^r), \tag{4}$$

where $W_i > 0$ is the positive definite weight matrix. It can be seen that $J_i(x_i(k+1))$ is a form of the discretized control error of control loop i at time t=k+1.

For the wireless networked control system (NCS), the overall cost function is defined as $$J(x(k+1)) = \sum_{i=1}^{N} J_i(x_i(k+1)) = (\hat{x}(k+1) - x^r)^T W(\hat{x}(k+1) - x^r), \tag{5}$$

where $W=\text{blkdiag}(W_1, W_2, \ldots W_N)$ is block diagonal matrix, $\hat{x}(k+1)$ and $x^r$ are expressed as $$\begin{cases} \hat{x}(k+1) = (\hat{x}_1(k+1), \hat{x}_2(k+1), \ldots, \hat{x}_N(k+1))^T, \\ x^r = (x_1^r, x_2^r, \ldots, x_N^r)^T. \end{cases} \quad (6)$$

It can be seen that $J(x(k+1))$ is the overall control error of all N control loops. Therefore, the optimal scheduling problem can be formulated as $$\min_{\eta_i} E(J(x(k+1))) \quad (7a)$$

Subject to $$\sum_{i=1}^{N} \eta_i \leq L \quad (7b)$$

$$x_i^{min} \leq \|x_i(k+1)\| \leq x_i^{max} \quad (7c)$$

$$u_i^{min} \leq \|u_i(k+1)\| \leq u_i^{max} \quad (7d)$$

$$W_i > 0 \quad (7e)$$

$$\eta_i \in \{0, 1, , 2, \ldots L\}, \forall i \in \{1, 2, \ldots, N\} \quad (7f)$$

where E represents the expectation operator, L is the total number of time slots in a scheduling period.

The optimization problem (7) is to minimize the overall control error of the wireless networked control system (NCS), i.e., to find number of transmission times $\eta_i$ for control loop i (i=1, 2, ..., N) such that overall control error is minimized. The constraint (7b) indicates the requirement of schedulability, i.e., total number of assigned time slots cannot exceed the total number of time slots in a scheduling period, the constraint (7c) indicates the range of the state vector $x_i(k+1)$, the constraint (7d) indicates the range of the control command vector $u_i(k+1)$, the constraint (7e) indicates that weight matrix $W_i$ is positive definite so that cost function $J_i(x_i(k+1))$ defines a proper control error $e_i$ and the constraint (7f) means that the number of transmission times $\eta_i$ is a non-negative integer for each control loop i (i=1, 2, ..., N).

The problem (7) is an integer programming problem in terms of decision variables $\eta_i$ (i=1, 2, ..., N). Furthermore, equation (3) shows that the problem (7) is nonlinear in terms of $\eta_i$ (i=1, 2, ..., N). Therefore, the problem (7) is a nonlinear integer programming, which can be solved by using appropriate nonlinear optimization solver or can be relaxed to integer linear programming problem, which can be solved by integer linear programming solvers such as Solving optimization problem (7) gives number of transmission times $\eta_i$ (i=1, 2, ..., N). It can be seen that $\eta_i$ could be zero. If i=0, the control loop i does not transmit in the corresponding scheduling period. This case indicates that there is at least one other control loop that has bigger control error than control loop i. If $\eta_i>1$, the control loop i transmit multiple times in the corresponding scheduling period. This case indicates that there is at least one other control loop that has smaller control error than control loop i.

The constraint (7b) also indicates that if all control loops perform well, the network scheduler 230 may not schedule transmission in all time slots. Instead, the scheduler only schedules transmission in subset of time slots. In other words, even if $\downarrow_i>0$, the scheduler may not schedule time slot to control loop i if its control error $e_i$ is very small. This approach reduces workload of wireless communication network 270 and therefore, reduces network congestion. Furthermore, even if a control loop is scheduled to transmit, the link layer acknowledgement can be eliminated if the control error is small. This further reduces communication congestion.

In the wireless networked control system (NCS), the control error $e_i$ (i=1, 2, ..., N) changes from time to time. Therefore, the number of transmission times $\eta_i$ (i=1, 2, ..., N) determined by solving problem (7) also changes from scheduling period to scheduling period.

Figure 5:
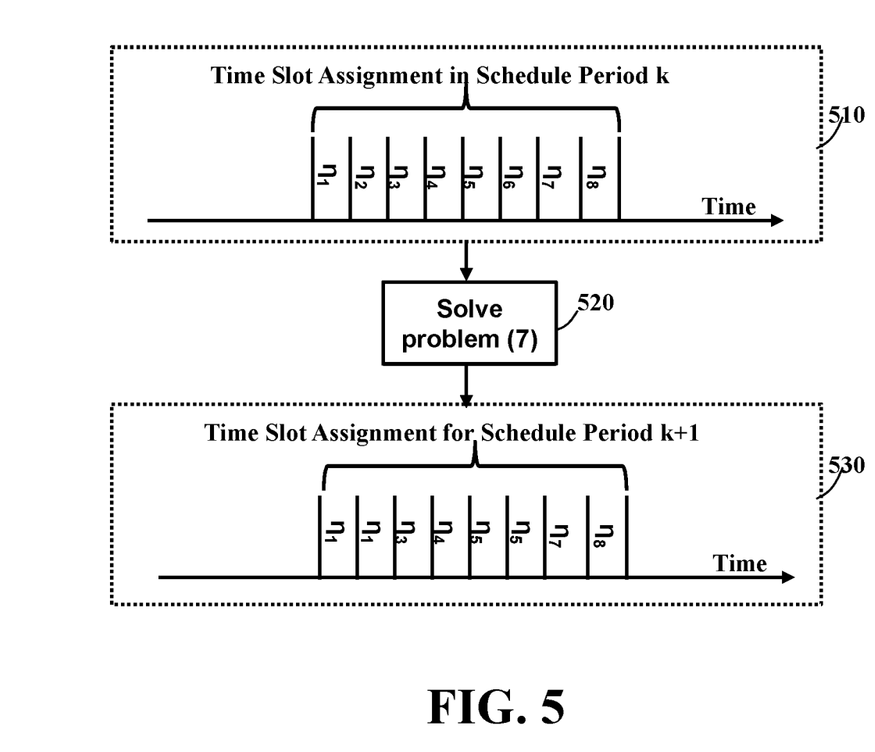
FIG. 5 shows an example of wireless networked control system of one embodiment with eight control loops and a scheduling period that also includes eight time slots.

FIG. 5 shows an example of wireless networked control system of one embodiment with eight control loops and a scheduling period also includes eight time slots. In scheduling period k 510, $\eta_i=1$ for all eight control loops, i.e., each control loop transmits exactly once. Solving problem (7) 520 for scheduling period k+1 530 gives $\eta_1=2, \eta_2=0, \eta_3=1, \eta_4=1, \eta_5=2, \eta_6=0, \eta_7=1$ and $\eta_8=1$. As a result, in scheduling period k+1, control loops 1 and 5 can transmit twice, but control loops 2 and 6 does not transmit, and rest of control loops transmit once.

Performance Dependent Time Slot Assignment

Solving optimization problem (7) gives number of transmission times $\eta_i$ for each control loop i (i=1, 2, ..., N). A scheduling period typically includes multiple time slots. The order of time slot assignment matters, e.g., which control loop should transmit in the first time slot and which control loop should transmit at last time slot. Therefore, time slot assignment is the task to be completed by the network scheduler next.

One way is to assign time slots to control loops according to ascending order of the control loop ID, i.e., the first $\eta_1$ time slots are assigned to control loop 1, the next $\eta_2$ time slots are assigned to control loop 2, and so on.

However, some embodiments are based on recognition that the order of time slot assignment can be used to reduce the overall control error caused by delays in network transmission. For example, the control loop that transmits in the first time slot has the shortest time delay for control command and sensor data. So the control loop can take early action to direct plant and reduce control error such that control loop performs better. The control loop that transmits in the last time slot has the longest time delay for control command and sensor data. So the control error may already become bigger when control loop takes action after the control command receiving.

Therefore, some embodiments use a sorting and/or spreading method to assign time slot based on the control error, i.e., the control loops with bigger control error are scheduled to transmit earlier so that the packet delay for those control loops are shorter, and the control loops with smaller control error are scheduled to transmit later because those control loops can tolerate the packet delay.

Additionally, or alternatively, if a control loop is given more than one transmission times, i.e., $\eta>1$, the $\eta$ time slots spread so that the control loop does not transmit in the consecutive $\eta$ time slots. This time slot spreading has several advantages: 1) improving packet delivery probability of the control loop because wireless link quality changes from time to time, the spreading transmission increases the probability of at least one transmission taking place in time slot with good link quality, 2) giving other control loops with earlier transmission opportunity to reduce the packet delay and improve control performance, and 3) reduce number of packet transmission in the case that if the first transmission is successful, remaining transmissions can be skipped. This also reduces wireless communication network workload.

The sorting and spreading are described as follows:

```
Input : Number of transmission times η_i, control error e_i, and total number
of time slots L
Output : The time slot assignment in next scheduling period: Assignment
Assignment ← zeros(L);
Slot ← 1;
for all i do
    η_i_left ← η_i ;
    //η_i_left represents unscheduled transmissions;
end error_matrix ←  [ 1   2   ...  N  ];
                [ e_1 e_2 ...  e_N]

// sorting
Sorted_control_loop_number ← sort loops (first row of error_matrix) in
descending order of e_i (second row of error_matrix);
while slot ≤ L and Σ_{i=1}^N η_i > 0 do
    for i in Sorted_control_loop_number do
        if η_i_left > 0 then
            Assignment(Slot) ← i;
            Slot ← Slot +1;
            η_i_left ← η_i_left −1;
        end
    end
end
// spreading
while Assignment(j) = Assignment(j + 1) // two consecutive slots assigned
to same control loop, then spreading
    randomly select a k such that j + 1 < k ≤ L;
    swap Assignment(j +1) and Assignment(k);
end
return Assignment
```

Figure 6:
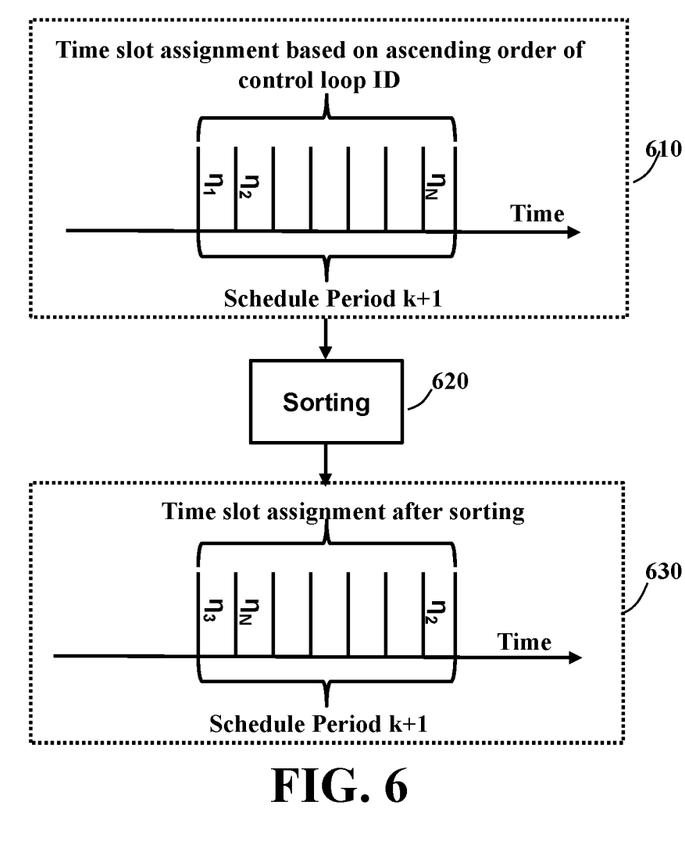
FIG. 6 shows an example of sorting-based time slot assignment according to one embodiment.

FIG. 6 shows an example of sorting-based time slot assignment according to one embodiment. In this example, a wireless networked control system has N control loops and a scheduling period consists of N time slots. Solving problem (7) gives $\eta_i=1$ (i=1, 2, . . . , N), i.e., one time slot for each control loop. The time slot assignment based on the ascending order of control loop ID is shown in 610. After sorting 620 the control error $e_i$ (i=1, 2, . . . , N) according to the descending order, the network scheduler assigns 630 the time slots according to the descending order of the control error. As a result, control loop 3 is assigned the first slot, control loop N is assigned the second slot and control loop 2 is assigned last slot. The sorting method reduces packet latency for control loops with poorer control performance. It can be proved that the problem (7) provides stable solution.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A networked control system (NCS) for controlling at least one plant, comprising:
   a receiver configured to receive a feedback signal indicative of a current state of a controlled variable of a plant over a wireless link;
   a controller configured to determine a control command based on a control error between a reference state of the controlled variable and the current state of the control variable;
   a processor configured to determine, based on a function of the control error, a number of transmission times a packet with the control command needs to be transmitted over the wireless link; and
   a transmitter configured to transmit the packet over the wireless link the number of transmission times, wherein the processor determines the number of transmission times for a scheduling period, wherein the NCS controls a set of plants based on a set of corresponding control errors, further comprising:
   a scheduler configured to determine priorities of the controlled plants based on their corresponding control errors and determine a schedule of transmission of the packets for different controlled plants according to the determined priorities, such that the transmitter transmits each packet according to the schedule.

2. The NCS of claim 1, wherein the processor uses a predetermined relationship between values of the control error and values of transmission times to determine the number of transmission times.

3. The NCS of claim 1, wherein the state observer determines quality of the wireless link between the controller and the plant based on the control error, and determines the number of transmission times of the wireless transmission of the packet based on the quality of the wireless link.

4. The NCS of claim 1, wherein the scheduler selects times of transmission of packets for different controlled plants in an order corresponding to an order of the control errors of the controlled plants, such that an earlier time of transmission is assigned to the packet for the controlled plants with bigger control error.

5. The NCS of claim 1, wherein the scheduler determines times of transmission of packets for different controlled plants by solving an optimization problem that aims to minimize a total control error of the set of controlled plans and then applying sorting and spreading.

6. The NCS of claim 1, wherein, for at least one next scheduling period, the state observer determines multiple packet transmissions for a first controlled plant and at least one packet transmission for a second controlled plant, and wherein the scheduler determines a schedule for the next scheduling period to include multiple packet transmissions for the first controlled plant and zero packet transmission for the second controlled plant.

7. The NCS of claim 1, wherein the scheduler determines future quality of wireless links with the controlled plants during the scheduling period based on corresponding control errors of the controlled plants and performs the scheduling using the quality of wireless links.

8. A method for controlling at least one plant over a wireless link, wherein the method uses a processor coupled with stored instructions implementing the method, wherein the instructions, when executed by the processor carry out at least some steps of the method, comprising:

receiving a feedback signal indicative of a current state of a controlled variable of a plant over a wireless link;

determining a control command based on a control error between a reference state of the controlled variable and the current state of the control variable;

determining, based on a function of the control error, a number of transmission times a packet with the control command needs to be transmitted over the wireless link; and transmitting the packet over the wireless link the number of transmission times, wherein the number of transmission times is determined for a scheduling period, and, wherein, for controlling a set of plants based on a set of corresponding control errors, the method further comprising: determining priorities of the controlled plants based on their corresponding control errors and determine a schedule of transmission of the packets for different controlled plants according to the determined priorities, such that the transmitter transmits each packet according to the schedule.

9. The method of claim 8, wherein the number of transmission times is determined using a predetermined relationship between values of the control error and values of link quality.

10. The method of claim 8, further comprising:

determining quality of the wireless link between the controller and the plant based on the control error, wherein the number of transmission times of the wireless transmission of the packet is determined based on the quality of the wireless link.

11. The method of claim 8, further comprising:

selecting time slots of transmission of packets for different controlled plants within the scheduling period in an order corresponding to an order of the control errors of the controlled plants, such that an earlier time of transmission is assigned to the packet for the controlled plants with bigger control error.

12. The method of claim 8, wherein the time slots of transmission of packets for different controlled plants are determined by solving an optimization problem that aims to minimize a total control error of the set of controlled plans and applying sorting and spreading.

13. A non-transitory computer readable storage medium embodied thereon a program executable by a processor for performing a method, the method comprising:

receiving a feedback signal indicative of a current state of a controlled variable of a plant over a wireless link;

determining a control command based on a control error between a reference state of the controlled variable and the current state of the control variable;

determining, based on a function of the control error, a number of transmission times a packet with the control command needs to be transmitted over the wireless link; and transmitting the packet over the wireless link the number of transmission times, wherein the number of transmission times is determined for a scheduling period, and, wherein, for controlling a set of plants based on a set of corresponding control errors, the method further comprising: determining priorities of the controlled plants based on their corresponding control errors and determine a schedule of transmission of the packets for different controlled plants according to the determined priorities, such that the transmitter transmits each packet according to the schedule.

14. The medium of claim 13, wherein the method further comprising:

selecting time slots of transmission of packets for different controlled plants within the scheduling period in an order corresponding to an order of the control errors of the controlled plants, such that an earlier time of transmission is assigned to the packet for the controlled plants with bigger control error.

* * * * *